US012630130B2

(12) United States Patent
Matsumoto

(10) Patent No.: US 12,630,130 B2
(45) Date of Patent: May 19, 2026

(54) AUTONOMOUS BRAKE CONTROL DUE TO CHANGES IN ENVIRONMENTAL CONDITIONS

(71) Applicant: SUBARU CORPORATION, Tokyo (JP)

(72) Inventor: Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 93 days.

(21) Appl. No.: 18/380,288

(22) Filed: Oct. 16, 2023

(65) Prior Publication Data

US 2024/0132032 A1    Apr. 25, 2024
US 2024/0227757 A9    Jul. 11, 2024

(30) Foreign Application Priority Data

Oct. 25, 2022    (JP) ................................. 2022-170779

(51) Int. Cl.
*G06V 20/56*      (2022.01)
*B60T 8/1764*    (2006.01)
*B60T 8/26*      (2006.01)

(52) U.S. Cl.
CPC .............. *B60T 8/1764* (2013.01); *B60T 8/26* (2013.01); *B60T 2210/10* (2013.01)

(58) Field of Classification Search
CPC .... B60T 2210/10; B60T 2210/12; B60T 7/12; B60T 8/1764; B60T 8/26
See application file for complete search history.

(56) References Cited

U.S. PATENT DOCUMENTS 11,597,384 B2 *   3/2023   Rodriguez Romero ..................... G06V 20/58
2017/0217419 A1 *   8/2017   Yen .......................... B60T 7/042
2022/0388545 A1 *   12/2022   Chae ................. B60W 60/0015

FOREIGN PATENT DOCUMENTS

JP       2021-130361 A     9/2021

* cited by examiner

*Primary Examiner* — Gonzalo Laguarda
(74) *Attorney, Agent, or Firm* — TROUTMAN PEPPER LOCKE LLP

(57) ABSTRACT

A vehicle travel control device includes a surrounding environment recognition device that acquires surrounding environment information on a surrounding environment of a vehicle; a vehicle state recognition device that acquires state information on a state of the vehicle; and a travel control unit that performs travel control of the vehicle, based on the surrounding environment information or the state information. When the vehicle state recognition device detects a slip of at least one drive wheel of the vehicle, the vehicle travel control device executes brake LSD control for braking the at least one drive wheel. When the surrounding environment recognition device recognizes snow on a traveling road of the vehicle and a snow melting area and a snow non-melting area ahead, the travel control unit switches an operation mode of the brake LSD control from a first mode to a second mode.

12 Claims, 4 Drawing Sheets

AUTONOMOUS BRAKE CONTROL DUE TO CHANGES IN ENVIRONMENTAL CONDITIONS

CROSS-REFERENCE TO RELATED APPLICATION

The present application claims priority from Japanese Patent Application No. 2022-170779 filed on Oct. 25, 2022, the entire contents of which are hereby incorporated by reference.

BACKGROUND

The disclosure relates to a vehicle travel control device that performs continuously stable travel control by suppressing a wheel slip when a vehicle travels between an area where snow is melted or removed and an area where snow is not melted or removed.

In the related art, various techniques for suppressing the wheel slip have been proposed as in, for example, Japanese Unexamined Patent Application Publication (JP-A) No. 2021-130361. The wheel slip is suppressed by, for example, if the wheel slip occurs while a vehicle or the like is traveling on a road or the like, performing drive control for reducing a driving torque of the vehicle, or performing brake control for braking the slipping drive wheel among drive wheels, for example.

The travel control device disclosed in JP-A No. 2021-130361 or the like above suppresses the wheel slip by performing, upon slipping of one drive wheel among the drive wheels, brake control for braking the slipping drive wheel.

In the related art, for example, in a cold region or the like, various kinds of equipment have been put into practical use, such as equipment for melting snow on a paved road surface of a roadway, a sidewalk, a parking lot, or the like, or equipment for suppressing freezing of the road surface.

For example, as the equipment for melting snow or the equipment for suppressing freezing of the road surface, equipment such as a road heating system or a snow melting pipe device is well known. The road heating system melts snow by heating the road surface by using electric heating wires, hot-water circulating pipes, or the like embedded in the paved road surface. The snow melting pipe device removes snow by spraying hot water, such as groundwater circulating through pipes embedded in the road surface, from nozzles installed on the road.

In addition, for example, a snow melting agent is sprayed on the road surface, or a snow removing vehicle is made to travel periodically. In general, the snow on the road surface has been melt or removed in the above manners.

However, the equipment such as the road heating system or the snow melting pipe device is expensive to install and maintain, and therefore is not generally installed on all roads. In addition, even in an area where the equipment such as the road heating system or the snow melting pipe device is installed, in some cases, the system, the device, or the like malfunctions, or the equipment is partially in a non-operation state for various reasons such as power saving, for example.

Furthermore, even if the snow melting agent is sprayed, in some cases, sufficient snow melting effects are not obtained in a very low temperature environment or the like. Furthermore, since the road on which the snow removing vehicle can travel is limited, in some cases, it is not possible to sufficiently remove snow in a narrow alley or sidewalk, for example. In many cases, snow is not sufficiently removed in a dedicated parking lot of a commercial facility, an apartment house, or the like, a parking space of an individual house, or the like.

Due to such various factors, as a road condition in winter in a cold region or the like, there usually are both an area where snow is melted or removed (hereinafter, referred to as a snow melting area) and an area where snow is not melted or removed (hereinafter, referred to as a snow non-melting area).

In such a situation, for example, there is a possibility that moisture melted in the snow melting area is stored at the boundary between the snow melting area and the snow non-melting area and is refrozen. In addition, at the boundary between the snow melting area and the snow non-melting area, in some cases, a step due to compacted snow or the like is generated between a road surface in the snow melting area and a compacted snow road surface in the snow non-melting area.

For example, when a vehicle enters a parking lot or the like from a roadway in the snow melting area, when a vehicle crosses a sidewalk in the snow non-melting area, or when a vehicle enters an alley or the like in the snow non-melting area from an arterial road in the snow melting area, a road surface situation changes rapidly. Therefore, for example, when traveling from the snow melting area to the snow non-melting area, it is expected to travel on a frozen portion at the boundary between the snow melting area and the snow non-melting area, or to travel over the step due to compacted snow. In such a case, there is a high possibility that the wheel slip occurs at the frozen portion or the step. As a result, in some cases, a driving force from a driving source (such as an engine or a driving motor) is not transmitted to all the drive wheels.

SUMMARY

An aspect of the present disclosure provides a vehicle travel control device. The vehicle travel control device includes a surrounding environment recognition device, a travel control unit, and a travel control unit. The surrounding environment recognition device is configured to acquire surrounding environment information on a surrounding environment of a vehicle. The vehicle state recognition device is configured to acquire state information on a state of the vehicle. The travel control unit is configured to perform travel control of the vehicle, based on one or both of the surrounding environment information and the state information. The vehicle travel control device is configured to, when the vehicle state recognition device detects a slip of at least one drive wheel among drive wheels of the vehicle, execute brake LSD control for performing brake control of the at least one slipping drive wheel. The travel control unit is configured to, when where the surrounding environment recognition device recognizes that the vehicle is traveling on snow and there is a region including both a snow melting area and a snow non-melting area on a traveling road in a traveling direction of the vehicle, switch a setting of an operation mode of the brake LSD control from a first mode as a normal mode to a second mode.

An aspect of the present disclosure provides a vehicle travel control device including circuitry. The circuitry is configured to: acquire surrounding environment information on a surrounding environment of a vehicle; acquire state information on a state of the vehicle; and perform travel control of the vehicle, based on one or both of the surrounding environment information and the state information. The vehicle travel control device is configured to, when the circuitry detects a slip of at least one drive wheel among drive wheels of the vehicle, execute brake LSD control for performing brake control of the at least one drive wheel. The circuitry is configured to, upon recognizing that the vehicle is traveling on snow and there is a region including both a snow melting area and a snow non-melting area on a traveling road in a traveling direction of the vehicle, switch a setting of an operation mode of the brake LSD control from a first mode as a normal mode to a second mode.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
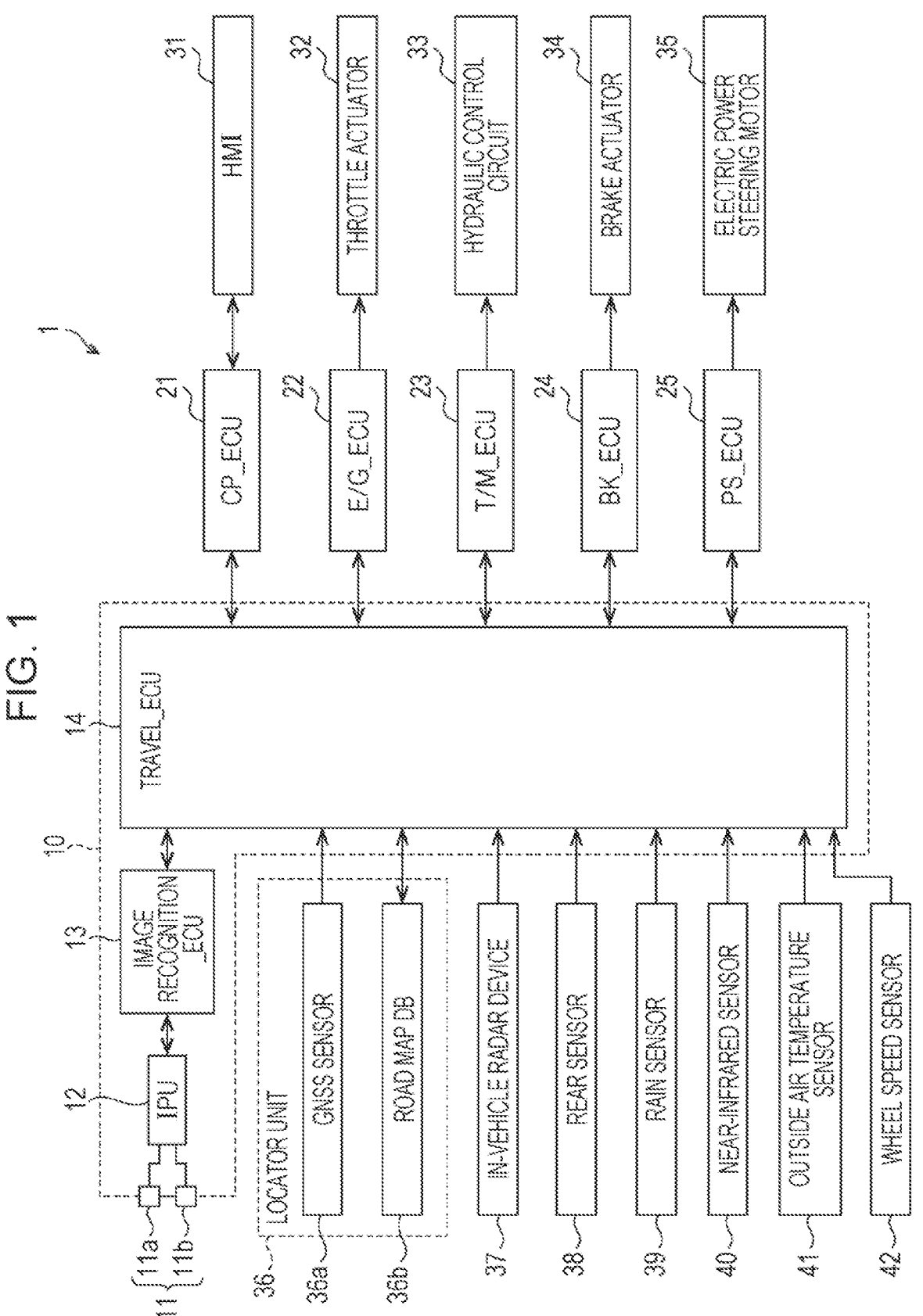
FIG. 1 is a block diagram illustrating a schematic configuration of a vehicle travel control device according to an embodiment of the present disclosure.

In drive control or brake control by a travel control device of the related art disclosed in JP-A No. 2021-130361 or the like, in accordance with a road surface situation, a driver who drives a vehicle performs a manual switching operation to perform or not to perform control. Therefore, there is a problem in that the driver is to determine the surrounding situation and appropriately perform the switching operation of the travel control device.

It is desirable to provide a vehicle travel control device that can perform continuously stable travel control while suppressing a wheel slip by performing appropriate control in accordance with a surrounding environment where a vehicle is traveling when the vehicle travels in an area including both a snow melting area and a snow non-melting area.

The present disclosure will be described below with reference to the embodiment illustrated in the drawings. Each drawing used in the following description is schematically illustrated, and in order to illustrate each constituent element in a recognizable size on the drawing, a dimensional relationship, a scale, or the like of each member may be illustrated differently for each constituent element. Therefore, the present disclosure is not limited to the embodiment illustrated in the drawings with respect to the number of constituent elements, the shape of each constituent element, the size ratio of each constituent element, the relative positional relationship of each constituent element, and the like.

In the description of the configuration and operation of the present embodiment, a road system is illustrated based on left-hand traffic in which a traffic division of the vehicle is the left side in a traveling direction. However, the configuration and operation of the present embodiment can be applied in exactly the same manner to a road system based on right-hand traffic if the left and right sides are interchanged.

First, a schematic configuration of a vehicle travel control device according to an embodiment of the present disclosure will be described below with reference to FIG. 1. FIG. 1 is a block diagram illustrating the schematic configuration of the vehicle travel control device according to the embodiment of the present disclosure. The basic configuration of the travel control device according to the present embodiment is substantially the same as that of a travel control device of the same type of the related art. Therefore, the following description is limited to a schematic description of the vehicle travel control device according to the present embodiment.

A vehicle travel control device 1 according to the present embodiment includes a camera unit 10, which is an in-vehicle camera device fixed to a central portion of a front upper portion in a vehicle cabin of a vehicle (hereinafter, referred to as a host vehicle) on which the travel control device 1 is mounted.

The camera unit 10 includes a stereo camera assembly 11, an image processing unit (IPU) 12, an image recognition unit (image recognition electronic control unit, image recognition_ECU) 13, and a travel control unit (travel_ECU) 14.

The stereo camera assembly 11 includes a main camera 11a and a sub camera 11b. The main camera 11a and the sub camera 11b are disposed, for example, at bilaterally symmetrical positions with the center in a vehicle-width direction interposed therebetween in the vehicle cabin of the host vehicle so as to face forward (in the traveling direction). In addition, the main camera 11a and the sub camera 11b are constituted by, for example, a complementary metal-oxide-semiconductor (CMOS) image sensor or the like, and generate a stereo image by acquiring two images of a surrounding environment in a predetermined range in front of the vehicle from different viewpoints in predetermined imaging cycles synchronized with each other.

The IPU 12 performs predetermined image processing on surrounding environment image data (image data representing the surrounding environment of the traveling host vehicle) captured by the stereo camera assembly 11 to detect edges of various objects such as an object in the image and a marking line marked on a road surface (hereinafter, simply referred to as a marking line or the like). As a result, the IPU 12 recognizes a three-dimensional object, the marking line, or the like around the vehicle. Then, the IPU 12 acquires distance information from positional deviation amounts of the corresponding edges in the left and right images, and generates image information (distance image information) including the distance information.

Based on the distance image information or the like received from the IPU 12, the image recognition_ECU 13 obtains road curvatures [1/m] of the marking lines that demarcate the left and right of a traveling road (host vehicle traveling road) on which the host vehicle travels and the widths (lane widths) between the left and right marking lines. Various methods for obtaining the road curvature and the lane width are known. For example, the image recognition_ECU 13 recognizes the left and right marking lines by binarizing the road curvatures using a brightness difference based on surrounding environment information, and obtains the curvatures of the left and right marking lines for each predetermined section by a curve approximation formula by the least square method or the like. Furthermore, the image recognition_ECU 13 calculates the lane width from the difference between the curvatures of the left and right marking lines.

Then, based on the curvatures of the left and right marking lines and the lane width, the image recognition_ECU 13 calculates a lane center, a host vehicle lateral position deviation, which is the distance from the lane center to the center of the host vehicle in the vehicle width direction, and the like.

The image recognition_ECU 13 also performs predetermined pattern matching or the like on the distance image information to recognize three-dimensional objects such as guardrails extending along a road, curbs, and peripheral vehicles, and also recognize the situation or the like of the road surface (hereinafter, referred to as a road surface situation or the like). Here, in the recognition of the three-dimensional objects in the image recognition_ECU 13, for example, types of the three-dimensional objects, heights of the three-dimensional objects, distances to the three-dimensional objects, speeds of the three-dimensional objects, relative speeds between the three-dimensional objects and the host vehicle, relative distances between the three-dimensional objects (for example, lateral distances between curbs or the like at road edges and marking lines or the like near the curbs), and the like are recognized. As the road surface situation or the like, for example, a situation in which the road surface is wet due to rain, snowmelt, or the like, a rainfall situation, a snow accumulation situation, a compacted snow situation, a road surface freezing situation, or the like is recognized.

Various kinds of information recognized in the image recognition_ECU 13 are output to the travel_ECU 14 as first surrounding environment information.

In this way, in the present embodiment, the image recognition_ECU 13 has a function as a surrounding environment recognition device that recognizes a first surrounding environment around the vehicle together with the stereo camera assembly 11 and the IPU 12.

The travel_ECU 14 is a control unit for integrally controlling the travel control device 1. As various control units, a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the travel_ECU 14 via an in-vehicle communication line such as a controller area network (CAN).

A human machine interface (HMI) 31 disposed around a driver's seat is coupled to the CP_ECU 21. The HMI 31 includes, for example, a switch for issuing an instruction for executing various kinds of driving support control, a mode change switch for switching a driving mode, and a steering touch sensor for detecting a steering state of the driver. The HMI 31 further includes, for example, a driver monitoring system (DMS) for the driver's face authentication, line of sight detection, or the like, a touch panel display, a combination meter, a speaker, and the like.

Upon receiving a control signal from the travel_ECU 14, the CP_ECU 21 appropriately notifies the driver of various alarms for a preceding vehicle or the like, an execution status of the driving support control, various pieces of information on the surrounding environment of the host vehicle, and the like by display, sound, or the like through the HMI 31. In addition, the CP_ECU 21 outputs various kinds of input information such as an on/off operation state with respect to various kinds of driving support control input by the driver through the HMI 31 to the travel_ECU 14.

A throttle actuator 32 or the like of an electronic control throttle is coupled to the output side of the E/G_ECU 22. In addition, various sensors such as an accelerator sensor (not illustrated) are coupled to the input side of the E/G_ECU 22.

The E/G_ECU 22 controls the driving of the throttle actuator 32, based on the control signal from the travel_ECU 14 or detection signals from various sensors. As a result, the E/G_ECU 22 adjusts an intake air amount of an engine to generate a desired engine power. In addition, the E/G_ECU 22 outputs a signal such as an accelerator opening degree detected by various sensors to the travel_ECU 14.

A hydraulic control circuit 33 is coupled to the output side of the T/M_ECU 23. In addition, various sensors such as a shift position sensor (not illustrated) are coupled to the input side of the T/M_ECU 23. The T/M_ECU 23 performs hydraulic control on the hydraulic control circuit 33, based on an engine torque signal estimated by the E/G_ECU 22, the detection signals from various sensors, and the like. As a result, the T/M_ECU 23 operates frictional engagement elements, pulleys, and the like provided in an automatic transmission to change an engine output with a desired transmission gear ratio. In addition, the T/M_ECU 23 outputs signals of a shift position and the like detected by various sensors to the travel_ECU 14.

A brake actuator 34 for adjusting a brake fluid pressure to be output to a brake wheel cylinder provided in each wheel is coupled to the output side of the BK_ECU 24. In addition, various sensors (not illustrated) such as a brake pedal sensor, a yaw rate sensor, a longitudinal accelerator sensor, and a vehicle speed sensor are coupled to the input side of the BK_ECU 24.

The BK_ECU 24 performs drive control on the brake actuator 34, based on the control signal from the travel_ECU 14 or the detection signals from various sensors. As a result, the BK_ECU 24 causes the wheels to appropriately generate braking forces for performing forced brake control, yaw rate control, and the like on the host vehicle. In addition, the BK_ECU 24 outputs signals of a brake operation state, a yaw rate, a longitudinal acceleration, a vehicle speed (host vehicle speed), and the like detected by various sensors to the travel_ECU 14.

An electric power steering motor 35 for applying a steering torque to a steering mechanism by a rotational force of the motor is coupled to the output side of the PS_ECU 25. In addition, various sensors (not illustrated) such as a steering torque sensor and a steering angle sensor are coupled to the input side of the PS_ECU 25.

The PS_ECU 25 performs drive control on the electric power steering motor 35, based on the control signal from the travel_ECU 14 or the detection signals from various sensors. As a result, the PS_ECU 25 generates a steering torque for the steering mechanism. In addition, the PS_ECU 25 outputs signals of a steering torque, a steering angle, and the like detected by various sensors to the travel_ECU 14.

Furthermore, a locator unit 36, an in-vehicle radar device 37, a rear sensor 38, a rain sensor 39, a near-infrared sensor 40, an outside air temperature sensor 41, a wheel speed sensor 42, and the like are coupled to the travel_ECU 14 as various sensors.

The locator unit 36 includes a global navigation satellite system (GNSS) sensor 36a and a high-precision road map database (road map DB) 36b.

The GNSS sensor 36a measures the position (latitude, longitude, altitude, and the like) of the host vehicle by receiving position measurement signals transmitted from position measurement satellites.

The road map DB 36*b* is a large-capacity storage medium such as a hard disk drive (HDD) or a solid state drive (SSD), and stores high-precision road map information (dynamic map). The road map DB 36*b* includes lane width data, lane center position coordinate data, lane traveling azimuth angle data, speed limit, and the like as lane data to be used for automatic driving. The lane data is stored in each lane on the road map at intervals of several meters.

In addition, the locator unit 36 can acquire real-time surrounding environment information (for example, traffic jam information, weather information, and the like) at the position of the host vehicle measured by the GNSS sensor 36*a* through communication with an external system. In this case, the weather information includes, for example, rainfall information, snowfall information, snow accumulation information, and the like of an area including the host vehicle position.

The road map DB 36*b* holds information on various facilities, parking lots, and the like. The road map DB 36*b* also holds installation area information of various kinds of equipment for melting snow or various kinds of equipment for suppressing freezing of the road surface in a cold region or the like (such as a road heating system or a snow melting pipe device. The road heating system melts snow by heating the road surface by using electric heating wires, hot-water circulating pipes, or the like embedded in the paved road surface. The snow melting pipe device removes snow by spraying hot water, such as groundwater circulating through pipes embedded in the road surface, from nozzles installed on the road; hereinafter, these are collectively referred to as snow melting equipment). The road map DB 36*b* further holds information acquired by the locator unit 36 communicating with an external system (not illustrated), for example, information on snow removing work by a snow removing vehicle or information on snow melting agent spraying work (for example, information on each work area, an operation schedule, and the like).

Based on a request signal from the travel_ECU 14, for example, the road map DB 36*b* outputs the road map information of a set range based on the host vehicle position measured by the GNSS sensor 36*a* to the travel_ECU 14 as third surrounding environment information.

As described above, in the present embodiment, the road map DB 36*b* has a function as the surrounding environment recognition device that recognizes a third surrounding environment around the vehicle together with the GNSS sensor 36*a*.

The in-vehicle radar device 37 includes sensors, such as millimeter wave radars. Here, the millimeter wave radars receive and analyze reflected waves from objects with respect to output radio waves, thereby mainly detecting three-dimensional objects such as pedestrians and parallel running vehicles, as well as structures and the like (for example, three-dimensional objects such as curbs, guard-rails, walls of buildings or the like, and plants) provided at road edges (for example, end portions on the road shoulder side). Furthermore, the millimeter wave radars also detect a three-dimensional obstacle or the like present on the road. In this case, the millimeter wave radars detect a lateral width of the three-dimensional object, a position of a representative point of the three-dimensional object (a relative position and a relative distance with respect to the host vehicle), a relative speed, and the like as specific information regarding the three-dimensional object.

Note that the sensors (the millimeter wave radars and the like) included in the in-vehicle radar device 37 are disposed, for example, on left and right side portions of a front bumper (referred to as front left and right side sensors), left and right side portions of a rear bumper (referred to as rear left and right side sensors), and the like. Then, the front left and right side sensors detect, as second surrounding environment information, three-dimensional objects present in areas diagonally in front of and on the left and right sides of the host vehicle, which are difficult to recognize in the image obtained by the stereo camera assembly 11. In addition, the rear left and right side sensors detect, as the second surrounding environment information, three-dimensional objects present in areas diagonally to the left and right sides and the rear of the host vehicle, which are difficult for the front left and right side sensors to recognize.

As described above, in the present embodiment, the in-vehicle radar device 37 has a function as the surrounding environment recognition device that recognizes a second surrounding environment around the vehicle. Then, the information acquired by each sensor of the in-vehicle radar device 37 is sent to the image recognition_ECU 13.

The rear sensor 38 is constituted by, for example, a sonar device. For example, at least one (or more than one) rear sensor 38 is disposed on the rear bumper. The rear sensor 38 detects, as fourth surrounding environment information, a three-dimensional object present in an area behind the host vehicle, which is difficult for the rear left and right side sensors to recognize.

As described above, in the present embodiment, the rear sensor 38 has a function as the surrounding environment recognition device that recognizes a fourth surrounding environment around the vehicle.

Note that each of the first surrounding environment information recognized by the image recognition_ECU 13, the third surrounding environment information recognized by the locator unit 36, the second surrounding environment information recognized by the in-vehicle radar device 37, and the fourth surrounding environment information recognized by the rear sensor 38 includes the coordinates of each object outside the vehicle. The coordinates are all converted into the coordinates of the three-dimensional coordinate system having the center of the host vehicle as the origin in the travel_ECU 14.

The rain sensor 39 is a sensor that detects raindrops, snowfall, or the like adhering to a front window. The information acquired by the rain sensor 39 is output to the travel_ECU 14. Then, in the travel_ECU 14, a control signal corresponding to the rainfall/snowfall amount or the traveling speed is generated, and for example, drive control of a wiper device or the like is performed. At the same time, based on the information acquired by the rain sensor 39, the weather information (information such as a rainfall/snowfall situation) around the host vehicle is recognized.

The near-infrared sensor 40 is a sensor that recognizes a surrounding situation of the host vehicle, for example, the road surface situation or the like, such as a road surface temperature. Based on the information acquired by the near-infrared sensor 40, the road surface temperature, a moisture amount on the road surface, a snow accumulation situation on the road surface, and the like are recognized.

The outside air temperature sensor 41 is a sensor that detects a change in the outside air temperature around the host vehicle.

The information acquired by the sensors such as the rain sensor 39, the near-infrared sensor 40, and the outside air temperature sensor 41 is detected as fifth surrounding environment information. In the present embodiment, the sensors such as the rain sensor 39, the near-infrared sensor 40, and the outside air temperature sensor 41 function as the surrounding environment recognition device that recognizes a fifth surrounding environment around the vehicle.

The wheel speed sensor 42 is a sensor that detects the wheel speed of each of wheels (normally, four wheels) of the host vehicle. The wheel speed sensor 42 detects the traveling speed of the host vehicle by detecting, for example, the rotational speed of each wheel. The wheel speed sensor 42 individually detects, for example, a locked state, a slip state, or the like of each wheel. Here, the wheel speed sensor 42 functions as a vehicle state recognition device that acquires state information of the host vehicle.

The travel_ECU 14 executes travel control for stable traveling of the vehicle, based on the information acquired by various sensors. For example, when a rotation difference between the wheels is detected based on output information of the wheel speed sensor 42 and the rotation difference occurs between the wheels, the E/G_ECU 22 performs engine power control and torque distribution control of the drive wheels, and also, the BK_ECU 24 executes individual brake control of the wheels to suppress unstable traveling of the vehicle.

Here, for example, control when the individual brake control by the BK_ECU 24 intervenes in a case where the rotation difference occurs between the wheels is referred to as brake limited slip differential (LSD) control. Since the brake LSD control itself is a well-known technique, a detailed description thereof will be omitted.

In the vehicle travel control device 1 according to the present embodiment, the brake LSD control is configured to be able to set operation modes in which a brake boosting speed or a brake pressure reduction timing is different when the individual brake control intervenes in each wheel. In the present embodiment, the following two operation modes are exemplified.

For example, normal brake LSD control is referred to as a first mode (or a standard mode), and an operation mode of performing enhancement control of the first mode is referred to as a second mode (or an enhancement mode).

In the second mode in the brake LSD control, for example, the brake boosting speed when the rotation difference occurs between the wheels is controlled to be higher than the brake boosting speed in the first mode. In addition, the brake pressure reduction timing when the rotation difference occurs between the wheels is controlled to be delayed with respect to the brake pressure reduction timing in the first mode.

By performing the brake LSD control process in the second mode as described above, the driving force during traveling on a more slippery road surface is further increased to implement stable traveling.

All or some of the locator unit 36, the image recognition_ECU 13, the travel_ECU 14, the CP_ECU 21, the E/G_ECU 22, the T/M_ECU 23, the BK_ECU 24, the PS_ECU 25, and the like are configured by a processor including hardware.

Here, the processor includes, for example, a known configuration including a central processing unit (CPU), a random access memory (RAM), a read only memory (ROM), a non-volatile memory, a non-volatile storage, a non-transitory computer readable medium, and the like, and peripheral devices thereof.

A software program to be executed by the CPU, fixed data such as a data table, and the like are stored in advance in the ROM, the non-volatile memory, the non-volatile storage, and the like. Then, the CPU reads the software program stored in the ROM or the like, loads the software program to the RAM, and executes the software program. In addition, the software program appropriately refers to various kinds of data or the like, and thereby, each function of each of the above-described constituent parts, the constituent units (13, 14, 21 to 25, and 36), and the like is implemented.

In addition, the processor may be configured by a semiconductor chip such as a field programmable gate array (FPGA). Furthermore, each of the above-described constituent parts, the constituent units (13, 14, 21 to 25, and 36), and the like may be configured by an electronic circuit.

Furthermore, the software program may be entirely or partially recorded as a computer program product in a portable template medium such as a flexible disk, a compact disc read only memory (CD-ROM), or a digital versatile disc read only memory (DVD-ROM), a non-transitory computer readable medium such as a card memory, a hard disk drive (HDD) device, or a solid state drive (SSD) device, or the like.

The operation of the vehicle travel control device according to the present embodiment configured as described above will be described below with reference to FIGS. 2 to 4.

Figure 2:
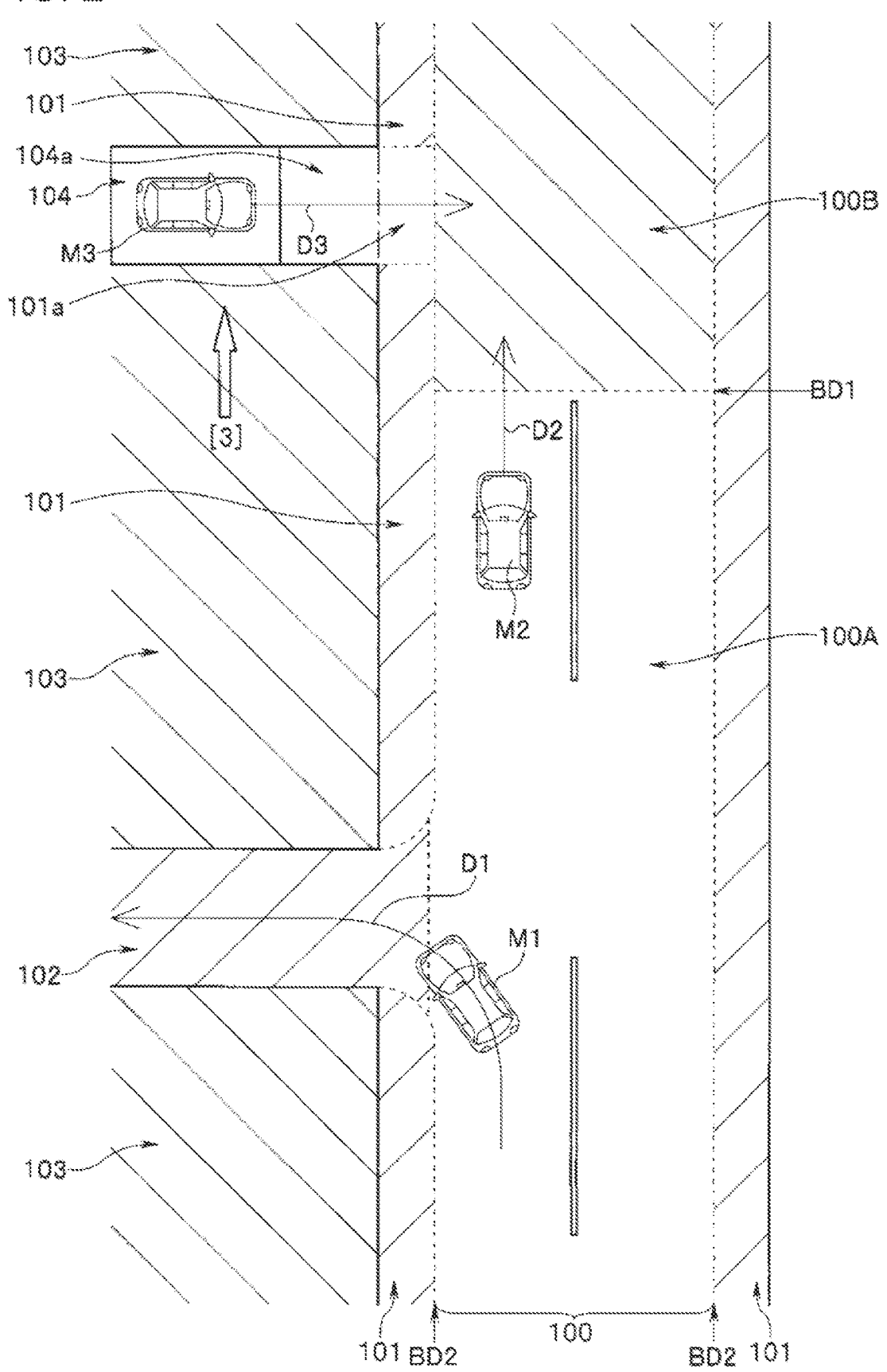
FIG. 2 is a conceptual diagram illustrating various situations in a case where a vehicle equipped with the vehicle travel control device according to the embodiment of the present disclosure is operated.

FIG. 2 is a diagram conceptually illustrating various situations in a case where a vehicle equipped with the vehicle travel control device according to the present embodiment is operated. FIG. 2 conceptually illustrates road conditions in winter in a cold region or the like.

First, in FIG. 2, reference numeral 100 denotes a roadway, reference numeral 101 denotes a sidewalk, reference numeral 102 denotes an alley, and reference numeral 103 denotes a site.

In FIG. 2, areas indicated by oblique lines indicate areas where snow is not melted or removed (hereinafter, referred to as snow non-melting areas). In FIG. 2, areas without oblique lines indicate areas where snow is melted or removed (hereinafter, referred to as snow melting areas).

The roadway 100 is an area for vehicles to travel. In the example in FIG. 2, it is assumed that the roadway 100 is a relatively wide arterial road having two lanes (one lane on each side). Here, it is assumed that snow melting equipment is installed on the roadway 100. In this case, an area indicated by reference numeral 100A indicates an area where the snow melting equipment is operated. Therefore, the area 100A of the roadway 100 is illustrated as the snow melting area (area without oblique lines).

In addition, an area indicated by reference numeral 100B indicates an area where the snow melting equipment is not operated or not installed. Therefore, the area 100B of the roadway 100 is illustrated as the snow non-melting area (area indicated by oblique lines).

In FIG. 2, a broken line BD1 indicates a boundary between the snow melting area 100A and the snow non-melting area 100B of the roadway 100. At this boundary BD1, a step is formed between the road surface of the snow melting area 100A and the compacted snow road surface of the snow non-melting area 100B (details will be described later. see FIG. 3 and the like).

The sidewalk 101 is provided along both side edges of the roadway 100, and is an area for pedestrians and the like to pass. In FIG. 2, a broken line BD2 indicates a boundary between the roadway 100 and the sidewalk 101. Here, the sidewalk 101 is illustrated as the snow non-melting area. However, as will be described later, a partial area 101a of the sidewalk 101 is illustrated as the snow melting area. Also at the boundary BD2, similarly to the above-described boundary BD1, a step is formed between the road surface of the snow melting area 100A and the compacted snow road surface on the sidewalk 101 serving as the snow non-melting area (details will be described later. see FIG. 3 and the like).

The alley 102 is coupled to the roadway 100, and is an area for vehicles, pedestrians, and the like to pass. In the example in FIG. 2, the alley 102 is assumed to be a roadway having a width slightly narrower than that of the roadway 100. Here, the alley 102 is illustrated as the snow non-melting area.

The site 103 is an area along the roadway 100, the sidewalk 101, or the like. There are a case where the site 103 is an area where a building or the like is present, a case where the site 103 is vacant, and a case where the site 103 is used as a parking lot or the like.

For example, in the example in FIG. 2, a garage installed in the site 103 is denoted by reference numeral 104. In this case, reference numeral 104a is within the area of the site 103 and indicates a part of a passage by which the garage 104 and the roadway 100 communicate (hereinafter, referred to as an in-site passage 104a). The in-site passage 104a communicates with the roadway 100 via the partial area 101a of the sidewalk 101. Therefore, when a vehicle (see reference numeral M3 illustrated in FIG. 2; details will be described later) exits from the garage 104 to the roadway 100, the vehicle passes through the in-site passage 104a and then crosses the partial area 101a of the sidewalk 101. On the other hand, when the same vehicle (M3) enters the garage 104 from the roadway 100, the vehicle (M3) crosses the partial area 101a of the sidewalk 101 and then passes through the passage 104a.

Here, the partial area 101a of the sidewalk 101, the in-site passage 104a, and the garage 104 are illustrated as the snow melting areas. In general, in a snow-covered area in a cold region or the like, snow on a passage between a garage or the like and a roadway is often removed by a user or the like. On the assumption of such a situation, the example in FIG. 2 is illustrated.

In addition, in FIG. 2, reference sign M indicates a host vehicle on which the vehicle travel control device 1 according to the present embodiment is mounted. Numerals 1 to 3 attached to reference sign M indicate various situations of the host vehicle M. Therefore, reference numeral M1 indicates the host vehicle in a first situation. Similarly, reference numeral M2 indicates the host vehicle in a second situation, and reference numeral M3 indicates the host vehicle in a third situation.

Here, the first situation is assumed to be, for example, a situation in which the host vehicle M1 traveling in the snow melting area 100A of the roadway 100 enters and travels in the alley 102 of the snow non-melting area. An arrow D1 in FIG. 2 indicates an assumed traveling trajectory of the host vehicle M1.

The second situation is assumed to be, for example, a situation in which the host vehicle M2 traveling in the snow melting area 100A of the roadway 100 continues traveling and enters and travels in the snow non-melting area 100B. An arrow D2 in FIG. 2 indicates an assumed traveling trajectory of the host vehicle M2.

The third situation is assumed to be, for example, a situation in which the host vehicle M3 in the garage 104 leaves the garage 104, passes through the in-site passage 104a and the partial area 101a (snow melting area) of the sidewalk 101, and enters the snow non-melting area 100B of the roadway 100 to travel. An arrow D3 in FIG. 2 indicates an assumed traveling trajectory of the host vehicle M3.

Figure 3:
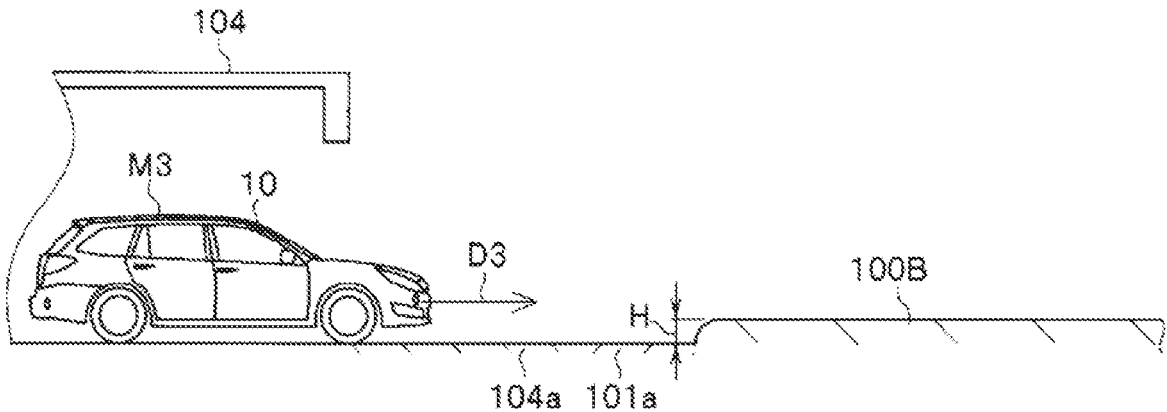
FIG. 3 is a conceptual diagram illustrating a third situation illustrated in FIG. 2 viewed from another direction.

FIG. 3 is a view conceptually illustrating the above-described third situation as viewed from another direction (the direction of an arrow [3] in FIG. 2). As described above, in the third situation, a situation in which the host vehicle M3 in the garage 104 leaves the garage 104 is assumed. Here, it is assumed that the garage 104 is provided with a roof and thus the inside of the garage 104 is the snow melting area. In addition, it is assumed that the in-site passage 104a and the partial area 101a of the sidewalk 101 are also the snow melting areas by the snow melting equipment or snow removing work. It is assumed that the roadway 100 leading to the in-site passage 104a and the partial area 101a is the snow non-melting area 100B. In this case, a step H (see FIG. 3) is formed at the boundary between the snow melting area and the snow non-melting area. Such a step H is generally formed by compacted snow having a height of, for example, about 10 to 20 cm.

In the first situation, the second situation, and the third situation described above, it is assumed that the host vehicles M1, M2, M3 travel from the snow melting area toward the snow non-melting area. That is, in the first to third situations, it is assumed that the vehicle travels from the snow melting area where the friction coefficient of the road surface is large and the road surface is not slippery to the snow non-melting area where the friction coefficient of the road surface is small and the road surface is slippery, and the vehicle travels over the step H.

In addition to the first to third situations described above, various similar situations can be considered. For example, in general, a large parking lot or the like attached to a commercial facility or the like is often the snow melting area by snow removing work. In this case, when the vehicle travels from the parking lot or the like (snow melting area) to the roadway (snow non-melting area), substantially the same situation as the above-described three situations occurs. In addition, the snow melting equipment may be installed on the sidewalk. In this case, for example, it is considered that a vehicle leaving the snow melting area such as the garage or parking lot crosses the sidewalk of the snow melting area and then leaves and travels in the snow non-melting area 100B of the roadway 100. Such a situation is similar to the third situation described above.

Next, the operation of the vehicle travel control device 1 according to the present embodiment will be described with reference to the flowchart in FIG. 4. This control process is a control process executed on the assumption that the vehicle traveling on snow is in the above-described traveling situation, that is, a situation in which the host vehicle M travels from the snow melting area to the snow non-melting area.

It is assumed that the host vehicle M on which the vehicle travel control device 1 according to the present embodiment is mounted is traveling on a road in winter in a cold region or the like, for example.

Figure 4:
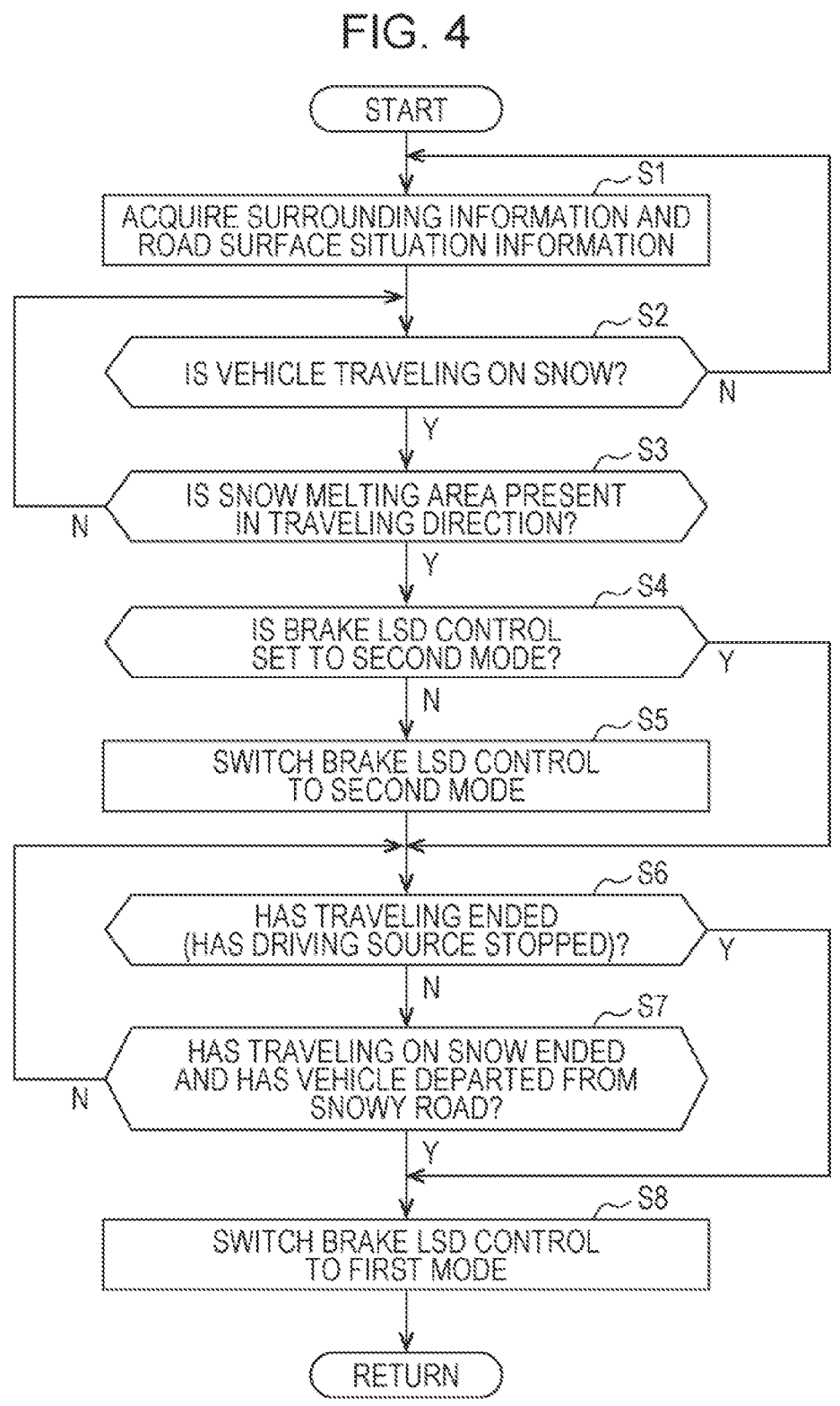
FIG. 4 is a flowchart illustrating an operation of the vehicle travel control device according to the embodiment of the present disclosure.

In such a situation, in step S1 in FIG. 4, the travel_ECU 14 of the camera unit 10 acquires information on the surrounding environment of the host vehicle M (surrounding information) and road surface situation information, based on various kinds of information acquired by various sensors such as the stereo camera assembly 11, the locator unit 36, the rain sensor 39, the near-infrared sensor 40, and the outside air temperature sensor 41.

Subsequently, in step S2, the travel_ECU 14 determines whether the traveling situation of the host vehicle M is traveling on snow, based on the information on the surrounding environment and the road surface situation information acquired in step S1 described above. The situation of traveling on snow is assumed to be, for example, a situation in which the road surface of the roadway 100 on which the host vehicle M is traveling is already covered with snow, and the host vehicle M is traveling in the snow non-melting area, according to the image information or the like from the stereo camera assembly 11, in addition to local weather information based on position information where the host vehicle M is traveling, snowfall information from the rain sensor 39, or the like.

Here, if it is determined that the host vehicle M is traveling on snow, the process proceeds to the subsequent step S3. In addition, if it is determined that the host vehicle M is not traveling on snow, the process returns to step S1 described above, and the process of acquiring the information on the surrounding environment is continued in step S1.

In step S3, the travel_ECU 14 determines whether the snow melting area is present in the traveling direction of the host vehicle M, based on the information on the surrounding environment and the road surface situation information acquired in step S1 described above.

Here, whether the snow melting area is present in the traveling direction of the host vehicle M is determined as follows. For example, in a case where the host vehicle M is traveling along a traveling route set in advance by a navigation system (not illustrated) or the like, the information on the surrounding environment of the area in the traveling direction along the set traveling route is checked. For example, in a case where the snow melting equipment or the like is installed in the traveling direction of the host vehicle M, it can be determined that the snow melting area is present in the traveling direction.

In addition, for example, it is possible to determine the presence of the snow melting area in the traveling direction from the road surface situation information recognized based on the image information from the stereo camera assembly 11. Furthermore, it is possible to determine the presence of the snow melting area in the traveling direction of the host vehicle M by recognizing the road surface temperature and the road surface situation, based on information from sensors such as the near-infrared sensor 40 and the outside air temperature sensor 41.

If it is determined that the snow melting area is present in the traveling direction of the host vehicle M in step S3 described above, the process proceeds to the subsequent step S4. In addition, if it is determined that there is no snow melting area in the traveling direction of the host vehicle M, the process returns to step S2.

In step S4, the travel_ECU 14 determines whether the brake LSD control is currently set to the second mode. If the brake LSD control has already been set to the second mode, the process proceeds to step S6. In addition, if the brake LSD control is not set to the second mode, the process proceeds to the subsequent step S5.

In step S5, the travel_ECU 14 performs a process of switching the setting of the brake LSD control to the second mode.

In this way, the host vehicle M traveling on snow (in the snow non-melting area) automatically switches the setting of the brake LSD control to the second mode if the snow melting area is present in the traveling direction. In this state, the host vehicle M enters the snow melting area present in the traveling direction. The situations at this time are exemplified as the first to third situations illustrated in FIGS. 2 and 3.

That is, when the host vehicle M traveling on snow (in the snow non-melting area) enters the snow melting area present in the traveling direction, as illustrated in FIG. 2, the host vehicle M travels in the snow melting area 100A of the roadway 100 (first situation and second situation). In the third situation, the host vehicle M3 is not traveling on snow but is about to leave the garage 104, and the snow melting area is present in the traveling direction.

Therefore, in any of the first to third situations in FIG. 2, the host vehicles M1, M2, and M3 change from a situation of being in the snow melting area to a situation of being about to travel in the snow non-melting area.

At this time, the step (H) is present at the boundary between the snow melting area and the snow non-melting area. The step (H) is low on the snow melting area side and high on the snow non-melting area side. Since the step (H) is in a compacted snow or frozen state, it is highly slippery. Therefore, in a case where the host vehicles M1, M2, and M3 travel from the snow melting area to the snow non-melting area, there is a high possibility that one of the drive wheels slips when the host vehicles M1, M2, and M3 travel over the step (H).

At this time, the brake LSD control of the travel control device 1 in the host vehicles M1, M2, and M3 is set to the second mode by the above-described control process. In the second mode, since the control is enhanced as compared with the normal first mode, the wheel slip can be suppressed more effectively, and the driving force from the driving source can be transmitted to each wheel more efficiently. Therefore, the host vehicles M1, M2, and M3 can travel more stably. In this way, the host vehicle M continues traveling.

Subsequently, in step S6 in FIG. 4, the travel_ECU 14 determines whether the traveling of the host vehicle M has ended. This determination is made, for example, by determining whether the driving source (such as a driving engine or a driving motor) has stopped. If the end of traveling is determined, the process proceeds to step S8. In addition, if the end of traveling is not determined, it is determined that the traveling is continued, and the process proceeds to the subsequent step S7.

In step S7, the travel_ECU 14 determines whether the traveling on snow has ended, or whether the vehicle has departed from the snowy road. This determination is made based on various kinds of information acquired by various sensors such as the stereo camera assembly 11.

The determination of the condition departed from the snowy road is made, for example, based on local weather information corresponding to the current position information of the host vehicle M, or rainfall/snowfall information or the like detected by the rain sensor 39 or the like.

In addition, it may be determined that the host vehicle M has departed from the snowy road if it is determined that the host vehicle M is continuously traveling for a predetermined time or more in a state in which snow is not present on the road surface of the roadway 100 on which the host vehicle M is traveling, based on the image information or the like acquired by the stereo camera assembly 11. As the predetermined time in this case, for example, a continuous travel time of about 30 minutes or a predetermined travel distance (for example, about 5 kilometers (km)) may be set as a threshold. The set threshold of the predetermined time may be appropriately changed depending on the type of the road on which the host vehicle M is traveling, for example, whether the road is an arterial road or an alley road.

Furthermore, not only the road surface situation of the road on which the host vehicle M is traveling, but also, for example, a snow accumulation situation, a snow covering situation, or the like on the sidewalk 101, the alley 102, or the like around the road may be taken into consideration to determine whether the host vehicle M has departed from the snowy road, and thus, it is possible to make the determination more reliably.

If the end of traveling on snow or departure from the snowy road is determined, the process proceeds to the subsequent step S8. In addition, if the end of traveling on snow or departure from the snowy road is not determined, the process returns to step S6.

In step S8, the travel_ECU 14 automatically switches the setting of the brake LSD control to the normal first mode. Subsequently, the series of steps end (return).

As described above, according to the above embodiment, the vehicle travel control device has a function of suppressing the wheel slip by the brake LSD control for performing, upon detection of a slip of at least one drive wheel among the drive wheels of the vehicle, the brake control of the slipping drive wheel. The vehicle travel control device executes control for automatically switching the setting of the operation mode of the brake LSD control from the normal first mode to the enhanced second mode if it is determined that the vehicle on which the travel control device is mounted is traveling on snow and is traveling in a region including both the snow melting area and the snow non-melting area.

Therefore, when the vehicle travels from the snow melting area to the snow non-melting area, for example, when the vehicle travels over the step due to the frozen portion, compacted snow, or the like at the boundary between the snow melting area and the snow non-melting area, continuously stable travel control can be performed while the wheel slip is suppressed because the brake LSD control is set to the second mode (enhancement mode) in advance.

In this way, by providing the second mode (enhancement mode) of the brake LSD control, it is possible to suppress the wheel slip more reliably during movement from the snow melting area to the snow non-melting area. Therefore, it is possible to ensure continuously stable traveling of the vehicle.

Since the operation mode of the brake LSD control is automatically switched to the second mode if the surrounding environment of the vehicle recognized by various sensors or the like satisfies the predetermined condition (that is, if the vehicle is traveling on snow and in a region including both the snow melting area and the snow non-melting area), the driver does not necessarily check the surrounding situation or the like of the host vehicle. Therefore, the driver can concentrate on driving, and thus can ensure safety traveling.

In addition, if it is determined that the vehicle has departed from the area of the surrounding environment of the predetermined condition, the operation mode of the brake LSD control is automatically switched to return to the first mode. Therefore, it is possible to perform appropriate travel control in accordance with the surrounding environment.

In the above-described embodiment, an example in which the present disclosure is applied to the travel control device in the vehicle having an engine as the driving source has been described, but the present disclosure is not limited to such an embodiment. For example, the present disclosure can be similarly applied to a travel control device of a vehicle using an electric motor as the driving source, and in this case, the same effects can be obtained.

The present disclosure is not limited to the above-described embodiment, and various modifications and applications can be made without departing from the scope of the disclosure. Furthermore, the above-described embodiment includes disclosures at various stages, and various disclosures can be extracted by appropriately combining disclosed constituent features. For example, even if some constituent features are deleted from all the constituent features illustrated in the above embodiment, the problem to be solved by the disclosure can be solved and the effects of the disclosure can be obtained, the configuration from which these constituent features are deleted can be extracted as a disclosure. Furthermore, constituent elements of different embodiments may be combined as appropriate. This disclosure is not constrained by the specific embodiments thereof except as limited by the appended claims.

According to the present disclosure, it is possible to provide the vehicle travel control device that can perform continuously stable travel control while suppressing the wheel slip by performing appropriate control in accordance with the surrounding environment where the vehicle is traveling if the vehicle travels in an area including both the snow melting area and the snow non-melting area.

The travel_ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the travel_ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle travel control device comprising:
one or more processors; and
one or more memories storing instructions for causing the one or more processors to:
acquire surrounding environment information on a surrounding environment of a vehicle;
acquire state information on a state of the vehicle;
perform travel control of the vehicle, based on one or both of the surrounding environment information and the state information;
detect whether there is a slip of at least one drive wheel among drive wheels of the vehicle; and
in response to detecting the slip of the at least one drive wheel among drive wheels of the vehicle, cause the vehicle travel control device to execute brake limited slip differential (LSD) control to perform brake control of the at least one drive wheel,
wherein, the one or more processors are configured to:
in response to determining that the vehicle is traveling on snow and there is a region including both a snow melting area and a snow non-melting area on a traveling road in a traveling direction of the vehicle, determine whether the vehicle is traveling from the snow melting area to the snow non-melting area based on the surrounding environment information; and
in response to determining that the vehicle is traveling from the snow melting area to the snow non-melting area, switch a setting of an operation mode of the brake LSD control from a first mode as a normal mode to a second mode before the vehicle travels over a boundary between the snow melting area and the snow non-melting area, the boundary comprising a step such that a road surface of the snow non-melting area is higher than a road surface of the snow melting area, the step being formed by compacted snow, wherein in the second mode of the brake LSD control:

a brake boosting speed at a time of intervention of the brake control is increased to a higher value than a brake boosting speed in the first mode, or a brake pressure reduction timing at the time of the intervention of the brake control is delayed from a brake pressure reduction timing in the first mode.

2. The vehicle travel control device according to claim 1, wherein the snow melting area is an area where a road heating system or a snow melting pipe device is installed, or an area where snow is removed, the road heating system and the snow melting pipe device being snow melting equipment.

3. The vehicle travel control device according to claim 1, wherein, the one or more processors are configured to, in response to determining that the vehicle has departed from a situation of traveling on snow, switch the setting of the operation mode of the brake LSD control from the second mode to the first mode.

4. The vehicle travel control device according to claim 1, wherein, the one or more processors are configured to cause the vehicle travel control device to execute brake LSD control for performing brake control of the at least one drive wheel such that the detected slip of the at least one drive wheel is suppressed.

5. The vehicle travel control device according to claim 1, wherein, the one or more processors are configured to:

determine whether the traveling on snow has ended; and in response to determining that the traveling on snow has ended, switch the setting of the operation mode of the brake LSD control from the second mode to the first mode.

6. The vehicle travel control device according to claim 3, wherein, the one or more processors are configured to, in response to determining that the vehicle has been traveling for a predetermined time or more on the traveling road in a traveling direction of the vehicle on which snow is not present, determine the vehicle has departed from the situation.

7. A vehicle travel control device comprising circuitry configured to:

acquire surrounding environment information on a surrounding environment of a vehicle;

acquire state information on a state of the vehicle, perform travel control of the vehicle, based on one or both of the surrounding environment information and the state information, detect whether there is a slip of at least one drive wheel among drive wheels of the vehicle; and in response to detecting the slip of the at least one drive wheel among drive wheels of the vehicle, cause the vehicle travel control device to execute brake limited slip differential (LSD) control for performing brake control of the at least one drive wheel, wherein, the circuitry is configured to:

in response to determining that the vehicle is traveling on snow and there is a region including both a snow melting area and a snow non-melting area on a traveling road in a traveling direction of the vehicle, determine whether the vehicle is traveling from the snow melting area to the snow non-melting area based on the surrounding environment information, in response to determining that the vehicle is traveling from the snow melting area to the snow non-melting area, switch a setting of an operation mode of the brake LSD control from a first mode as a normal mode to a second mode before the vehicle travels over a boundary between the snow melting area and the snow non-melting area, the boundary comprising a step such that a road surface of the snow non-melting area is higher than a road surface of the snow melting area, the step being formed by compacted snow, wherein in the second mode of the brake LSD control:

a brake boosting speed at a time of intervention of the brake control is increased to a higher value than a brake boosting speed in the first mode, or a brake pressure reduction timing at the time of the intervention of the brake control is delayed from a brake pressure reduction timing in the first mode.

8. The vehicle travel control device according to claim 7, wherein the snow melting area is an area where a road heating system or a snow melting pipe device is installed, or an area where snow is removed, the road heating system and the snow melting pipe device being snow melting equipment.

9. The vehicle travel control device according to claim 7, wherein, the circuitry is configured to cause the vehicle travel control device to execute brake LSD control for performing brake control of the at least one drive wheel such that the detected slip of the at least one drive wheel is suppressed.

10. The vehicle travel control device according to claim 7, wherein, the circuitry is configured to:

determine whether the traveling on snow has ended; and in response to determining that the traveling on snow has ended, switch the setting of the operation mode of the brake LSD control from the second mode to the first mode.

11. The vehicle travel control device according to claim 7, wherein the circuitry is configured to, in response to determining that the vehicle has departed from a situation of traveling on snow, switch the setting of the operation mode of the brake LSD control from the second mode to the first mode.

12. The vehicle travel control device according to claim 11, wherein, the circuitry is configured to, in response to determining that the vehicle has been traveling for a predetermined time or more on the traveling road in a traveling direction of the vehicle on which snow is not present, determine the vehicle has departed from the situation.

* * * * *